March 19, 1957 D. M. WHERRY 2,786,138

HIGHLY SELECTIVE KEYING CIRCUIT

Filed Dec. 10, 1953

INVENTOR
DONALD M. WHERRY

BY [signature] [signature]

ATTORNEYS

United States Patent Office 2,786,138

Patented Mar. 19, 1957

2,786,138

HIGHLY SELECTIVE KEYING CIRCUIT

Donald M. Wherry, Camarillo, Calif.

Application December 10, 1953, Serial No. 397,496

12 Claims. (Cl. 250—36)

(Filed under Rule 47(b) and 35 U. S. C. 118)

The invention described herein may be manufactured and used by or for the Government of the United States of America for governmental purposes without the payment of any royalties thereon or therefor.

The present invention relates to a highly selective keying circuit and more particularly to a highly selective keying circuit utilizing an arrangement wherein the noise and "ringing" encountered in conventional highly selective circuits are substantially eliminated.

The invention circuit is especially adapted for use in code reception, and it may be employed as a selective auxiliary circuit for use in conjunction with a standard amateur receiver or the like. It is obviously desirable to utilize highly selective circuits in code reception operations, but as is well-known in the art, such circuits cause "ringing" at both audio and radio frequencies which eventually causes the circuits to be unusable as the selectivity is increased. Furthermore, operator fatigue caused by the characteristic "noise" associated with the highly selective circuits also places a practical limitation upon the amount of selectivity permissible in code reception circuits.

The audio output signals of a conventional amateur receiver or the like are fed into the invention circuit wherein a keyer means controls the operation of a relaxation oscillator which provides the output signals of the circuit. The keyer means is selectively biased such that the signal it is desired to receive will trigger the oscillator, but substantially all "noise" and interfering signals of less magnitude than the desired signal will not trigger the oscillator, thereby greatly reducing operator fatigue. The output of the circuit may be adjusted to produce a tone pleasant to the ear, and since the output of the circuit is produced only by the relaxation oscillator therein, no "ringing" will be present in the output.

An object of the present invention is the provision of a new and novel highly selective keying circuit which substantially eliminates the "noise" associated with highly selective circuits.

Another object is to provide a new and novel highly selective keying circuit which substantially eliminates all "ringing."

A further object of the invention is the provision of a new and novel highly selective keying circuit which is simple and inexpensive in construction, yet sensitive and reliable in operation.

Other objects and many of the attendant advantages of this invention will be readily appreciated as the same becomes better understood by reference to the following detailed description when considered in connection with the accompanying drawings wherein.

Figure 1:
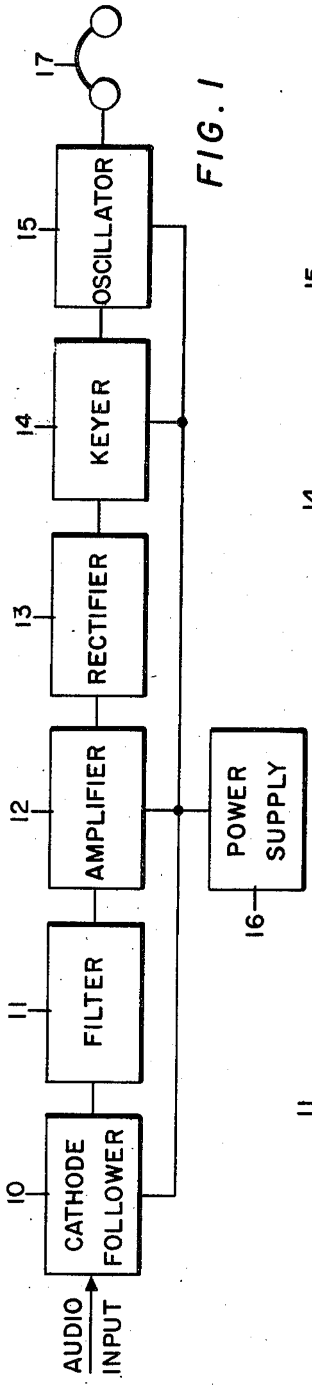
Fig. 1 is a block diagram of the invention circuit.

Referring now to the drawing, wherein like reference characters designate like or corresponding parts throughout the several views, there is shown diagrammatically in Fig. 1 a cathode follower 10 which is adapted to receive the audio output signals of a conventional amateur receiver or the like, the output of the cathode follower being connected to the input of a highly selective audio band pass filter 11. The output of the filter is connected to the input of an amplifier 12, and the output of the amplifier is connected to the input of a rectifier 13 which changes the A. C. voltage output of the amplifier into a D. C. voltage. The D. C. output of the rectifier is connected to a keyer 14 which is connected to and controls the operation of a relaxation oscillator 15. A power supply 16 energizes the entire circuit, and a suitable means such as a pair of earphones 17 is connected to the output of the oscillator.

Figure 2:
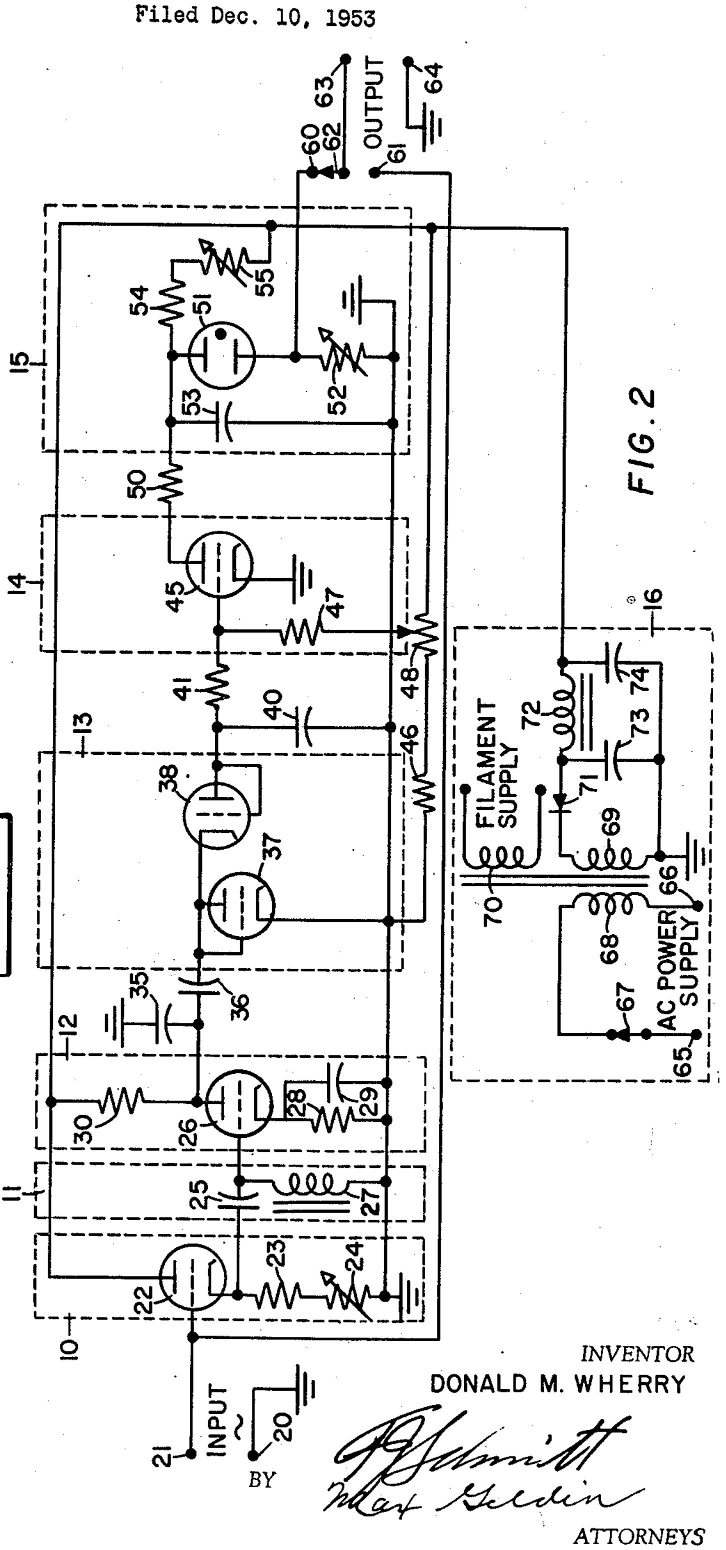
Fig. 2 is a schematic diagram of the circuit of Fig. 1 wherein the circuitry of the various components is shown in detail.

Referring now to Fig. 2, it may be seen that a first input terminal 20 is connected to ground and a second input terminal 21 is connected to the grid of a triode cathode follower tube 22, the plate of the tube being connected to the power supply and the cathode of the tube being connected to ground through a fixed resistor 23 and a variable resistor 24. The cathode follower is suitably designed so as to provide the proper impedance match between the input of the invention circuit and the ouput of the receiver to which the circuit is connected. A capacitor 25 couples the output of tube 22 to the grid of a triode amplifier tube 26, and capacitor 25, coil 27, resistors 23 and 24 comprise a resonant circuit, the selectivity of which may be adjusted by means of variable resistor 24. Capacitor 25 and coil 27 are designed to provide a highly selective audio band pass filter in accordance with the audio frequency which is normally fed into the input of the circuit.

The cathode of tube 26 is connected to ground through a conventional cathode bias resistor 28 and a by-pass capacitor 29, and the plate of the amplifier is connected to the power supply through a load resistor 30. A capacitor 35 serves as a high frequency by-pass to ground for the output of the amplifier and capacitor 36 couples the output of the amplifier to rectifier 13 which comprises two plate-grid connected tubes 37, 38 which are disposed in a voltage doubling rectifier arrangement.

Capacitor 40 and resistor 41 serve as a filter to remove the ripple from the output of rectifier 13, resistor 41 also serving to couple the output of the rectifier to the grid of a keyer tube 45. The grid of tube 45 is also connected to the cathode of tube 37 through a bias resistor network including fixed resistors 46, 47 and a selectively variable resistor 48.

Resistor 50 limits the plate current of tube 45 to a desired value and couples the output of the keyer tube to a relaxation oscillator comprising a neon bulb 51, a selectively variable resistor 52 connected in series therewith to ground, and a capacitor 53 connected in parallel therewith. A fixed resistor 54, and a selectively variable resistor 55 connect the oscillator to the power supply. Resistor 52 is adapted to vary the magnitude or volume of the output signal of the oscillator, and resistor 55 is adapted to vary the frequency or tone of the output signal of the oscillator.

With no signal input and no bias present on tube 45, the plate current drawn by the tube causes such a large voltage drop in resistors 54 and 55 that tube 51 will not ionize and consequently there will be no output signal developed by the oscillator. When an input signal is impressed on the circuit, a negative D. C. voltage is applied to the grid of tube 45 which cuts off the tube, thereby interrupting the flow of plate current and allowing the voltage on tube 51 to build up and cause a saw-tooth oscillatory output voltage to be developed by the oscillator.

A first switch terminal 60 is connected between an electrode of tube 51 and resistor 52, and a second switch terminal 61 is connected to input terminal 21. A single-pole double-throw switch 62 is adapted to be selectively actuated to engage either contact 60 or 61, and the switch is connected to a first output terminal 63. A second output terminal 64 is connected to ground, and it is evident that when switch 62 is in the position shown, the output is taken across the invention circuit, but that if it is desired to do so, the switch may be actuated to engage contact 61 and by-pass the circuit, taking the output across the input terminals 20 and 21.

The power supply 16 includes two terminals 65 and 66 which are adapted to be connected to a suitable A. C. voltage source, and a switch 67 is adapted to energize or deenergize the circuit. Coil 68 represents the primary winding of a transformer and coils 69 and 70 respectively represent the secondary and filament windings of the transformer. The filament winding provides the power for the heater filaments (not shown) of each of the tubes in the circuit. The lower end of coil 69 is connected to ground and the upper end thereof is connected to a diode rectifier 71 which may be a selenium rectifier or the like whereby the A. C. voltage induced in secondary winding 69 is changed into a D. C. voltage for energizing the circuit. Coil 72 and capacitors 73, 74 provide a filter for reducing the ripple of the power supply voltage.

In operation, the circuit is initially adjusted such that filter 11 exhibits a highly selective band pass characteristic to the audio input signal impressed on terminals 20 and 21, and tube 26 is designed for maximum gain. It is apparent that a positive biasing voltage is impressed on the grid of tube 45 through the resistor network including resistors 46–48 and that by selectively varying the resistance of resistor 48, the positive bias on the tube may be altered. The positive bias on the grid of tube 45 is adjusted such that it is slightly less, e. g. one-quarter volt, than the negative voltage impressed thereon by the signal which it is desired to receive whereby the signal will cut off the tube and key the oscillator. In this manner, the desired signal actuates oscillator 15, yet any "noise" or interfering signals producing a potential on the keyer grid less than that of the positive bias thereon will not trigger the oscillator. It is therefore apparent that by properly adjusting the threshold value of tube 45 by means of resistor 48, the keying voltage level can be set above that of any interfering signal, even in the case where the interfering signal is on the same frequency as the desired signal.

It should be noted that by utilizing the invention circuit, it would also be possible to transmit and receive code and telephone signals simultaneously on the same radio frequency channels and that multiple code channels on one frequency would be greatly simplified.

Although a preferred embodiment of the present invention has been shown and described, it is apparent that other well-known electronic tubes and components may be substituted for those employed in each of units 10–16. For example, a high gain pentode may be substituted for tube 26 and two crystal diodes could be used in place of tubes 37 and 38. A sharp cutoff pentode could be used as the keyer tube, and various other well-known relaxation oscillators could replace the one shown in the drawings.

From the foregoing, it is evident that there is provided a new and novel highly selective keying circuit which substantially eliminates the "noise" and "ringing" associated with highly selective circuits, and which is simple and inexpensive in construction, yet sensitive and reliable in operation.

Obviously many modifications and variations of the present invention are possible in the light of the above teachings. It is therefore to be understood that within the scope of the appended claims the invention may be practiced otherwise than as specifically described.

I claim:

1. A highly selective keying circuit which comprises a source of signals, a low frequency resonant circuit including means for damping said resonant circuit for filtering said signals, means for amplifying said filtered signals, means for rectifying said amplified signals, keyer means energized by said rectified signals, oscillator means controlled by said keyer means, and a source of power for each of said aforementioned means.

2. A circuit as defined in claim 1 including a variable resistor network adapted to bias said keyer means whereby the threshold value of said keyer means may be varied.

3. A highly selective keying circuit which comprises an impedance matching means, a low frequency resonant circuit including means for damping said resonant circuit, said resonant circuit being connected to the output of said impedance matching means, an amplifier connected to the output of said resonant circuit, a rectifier connected to the output of said amplifier, a keyer connected to the output of said rectifier, an oscillator connected to the output of said keyer, and a source of power for said circuit.

4. A highly selective keying circuit which comprises a source of signals, a low frequency resonant circuit including means for damping said resonant circuit, said resonant circuit being adapted to filter said signals, amplifier means connected to said resonant circuit, rectifier means connected to said amplifier means, keyer means connected to said rectifier means, a variable resistor network connected between said rectifier means and said keyer means whereby the threshold value of said keyer means may be varied, relaxation oscillator means connected to said keyer means, and a source of power for said circuit.

5. A circuit as defined in claim 4 including means for adjusting the selectivity of said resonant circuit.

6. A circuit as defined in claim 4 including means for adjusting the frequency of said oscillator means.

7. A circuit as defined in claim 4 including means for filtering the output of said rectifier means.

8. A highly selective keying circuit which comprises a signal input means connected to a cathode follower means, a low frequency resonant circuit including means for damping said resonant circuit, said resonant circuit being connected to the output of said cathode follower means, an amplifier means connected to the output of said resonant circuit, rectifier means connected to the output of said amplifier means, filter means connected to the output of said rectifier means, keyer means connected to the output of said second filter means, a resistor network connected between said rectifier means and said keyer means, at least one resistor in said resistor network being selectively variable, oscillator means connected to the output of said keyer means and controlled thereby, output means connected to the output of said oscillator means, and a power supply for said circuit.

9. A circuit as defined in claim 8 wherein said oscillator is a relaxation oscillator of the gas tube type.

10. A circuit as defined in claim 8 including a switch means whereby said output means may be selectively connected to the output of said oscillator means or directly to said input means.

11. A highly selective keying circuit which comprises an input means connected to the grid of a cathode follower tube, the output of said cathode follower being connected to a low frequency resonant circuit including means for damping said resonant circuit, means for adjusting the selectivity of said resonant circuit, the output of said resonant circuit being connected to the grid of an amplifier tube, the output of said amplifier tube being connected to a rectifier means comprising a plurality of plate-grid connected tubes disposed in a voltage doubling arrangement, the output of said rectifier means being coupled by a filter means to the grid of a keyer tube, a resistor network connected between said rectifier means and the grid of said keyer tube, at least one resistor in said resistor network being variable, a relaxation oscillator connected to the output of said keyer tube and controlled thereby, means for controlling the frequency of said oscillator, means for controlling the magnitude of the output signal from said oscillator, output means connected to said oscillator, and a power supply for said circuit.

12. A circuit as defined in claim 11 wherein said power supply comprises a source of alternating current, transformer means connected to said source, rectifier means connected to the output of said transformer, and filter means connected to the output of said rectifier means.

References Cited in the file of this patent

UNITED STATES PATENTS

| | | |
|---|---|---|
| 1,868,614 | Overacker | July 26, 1932 |
| 1,910,537 | Hagen | May 23, 1933 |
| 2,107,425 | Protze | Feb. 8, 1938 |
| 2,142,218 | Spencer et al. | Jan. 3, 1939 |
| 2,495,805 | Bliss | Jan. 31, 1950 |